(12) United States Patent
Jaekel et al.

(10) Patent No.: US 10,518,359 B2
(45) Date of Patent: Dec. 31, 2019

(54) METHOD OF WELDING IN DEEP JOINTS (71) Applicant: GENERAL ELECTRIC TECHNOLOGY GMBH, Baden (CH)

(72) Inventors: Dirk Jaekel, Rheinfelden (DE); Balint Horvath, Zürich (CH); Sorin Keller, Oberrohrdor (CH); Guenter Ambrosy, Stuttgart (DE)

(73) Assignee: General Electric Technology GMBH, Baden (CH)

( * ) Notice: Subject to any disclaimer, the term of this patent is extended or adjusted under 35 U.S.C. 154(b) by 509 days.

(21) Appl. No.: 14/886,164

(22) Filed: Oct. 19, 2015

(65) Prior Publication Data
US 2016/0114433 A1 Apr. 28, 2016

(30) Foreign Application Priority Data
Oct. 24, 2014 (EP) ..................... 14190216

(51) Int. Cl.
*B23K 26/34* (2014.01)
*B23K 26/348* (2014.01)
*B23K 9/02* (2006.01)
*B23K 26/067* (2006.01)
*B23K 9/167* (2006.01)
(Continued)

(52) U.S. Cl.
CPC .......... *B23K 26/348* (2015.10); *B23K 9/0213* (2013.01); *B23K 9/16* (2013.01);
(Continued)

(58) Field of Classification Search
CPC ........ B23K 9/0213; B23K 9/16; B23K 9/167; B23K 26/348; B23K 26/21; B23K 26/067; B23K 26/123; B23K 26/1429
(Continued)

(56) References Cited

U.S. PATENT DOCUMENTS 4,591,688 A * 5/1986 Koch ..................... B23K 15/02
219/121.29
6,191,379 B1 * 2/2001 Offer .................... B23K 9/0213
219/121.63
(Continued)

FOREIGN PATENT DOCUMENTS

DE 44 38 303 A1 5/1995
EP 0 100 933 A1 2/1984
(Continued)

OTHER PUBLICATIONS

International Search Report issued in connection with corresponding EP application No. 14190216 dated Feb. 12, 2015, 6 pages.

*Primary Examiner* — Brian W Jennison
(74) *Attorney, Agent, or Firm* — Frank A. Landgraff; Hoffman Warnick LLC (57) ABSTRACT

The present relates to a method of welding in deep joints in narrow-gap geometry. The two metallic components are arranged next to each other such that there is nearly a zero gap between the two components. The step of joining two metallic components is performed in two stages, the first stage being a root weld and the second stage being a fill up weld. The root weld is completed at the joining of the two discs starting from a middle portion to a point up to which there is still a zero gap between the two discs. From the point there exists a non-zero gap between the two discs up to an outer portion. The filler gap is filled by fill up welding. During fill up welding, a filler wire is melted along with the two discs by using the first source of energy, and to fill the filler gap along with molten material of the two discs.

17 Claims, 7 Drawing Sheets

(51) Int. Cl.
*B23K 26/21* (2014.01)
*B23K 9/16* (2006.01)
*B23K 26/12* (2014.01)

(52) U.S. Cl.
CPC ............ *B23K 9/167* (2013.01); *B23K 26/067* (2013.01); *B23K 26/123* (2013.01); *B23K 26/21* (2015.10)

(58) Field of Classification Search
USPC ...................................................... 219/125.1
See application file for complete search history.

(56) References Cited

U.S. PATENT DOCUMENTS 8,378,248 B2 * 2/2013 Simpson ............ B23K 26/0608
219/121.35

2005/0028897 A1 2/2005 Kurz et al.
2011/0215074 A1 * 9/2011 Wang ..................... B23K 9/091
219/121.64
2012/0000892 A1 * 1/2012 Nowak .................. B23K 9/173
219/121.64
2012/0097645 A1 * 4/2012 Clark ................. B23K 15/0006
219/121.14
2012/0298638 A1 11/2012 Beck et al.
2013/0056449 A1 * 3/2013 Lin ........................ B23K 26/26
219/121.64

FOREIGN PATENT DOCUMENTS

| EP | 0 483 385 A1 | 5/1992 |
| EP | 2 388 342 A1 | 11/2011 |
| EP | 2 402 107 A1 | 1/2012 |

* cited by examiner

METHOD OF WELDING IN DEEP JOINTS

CROSS-REFERENCE TO RELATED APPLICATIONS

This application claims priority to European Patent Application 14190216.3 filed Oct. 24, 2014, the contents of which are hereby incorporated in its entirety.

TECHNICAL FIELD

The present disclosure relates to a method of welding, and more particular, to a method related to welding in deep joints in narrow gap geometry.

BACKGROUND

In a welding process, a first part and a second part to be welded together at least locally receive a heat input in a welding zone to locally melt the parts. In this process, only a relatively small volume of the parts is heated to a high temperature, and thereafter rapidly cools. There has been limited capability so far to increase the weldability and quality of the weld during the welding in narrow-gap geometry, e.g. to reduce the chance for cracks, to lower porosity and lack of fusion during welding. Moreover the capabilities have been limited to positively change the mechanical properties of the weld joint and to increase the welding speed/deposition-rate. In previous attempts the metal parts are welded together by the laser beam with the formation of a weld seam. A heat treatment of the weld seam is provided through additional source along with laser beam as first source. These methods are intended to cancel out structural changes of the material of the metal parts again due to the welding thereof in the region of the weld seam infusing solidification defects such as cracks, pores and lack of fusion together.

SUMMARY

The present disclosure describes a method of welding that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a method of welding to overcome the quality defects such as cracks, pores and lack of fusion together by stabilizing the entire welding process through integrated use of different heating sources. With this method the welding process is optimized in order to ensure joint quality and there is increase in the efficiency of the welding process. Various other objects and features of the present disclosure will be apparent from the following detailed description and claims.

The above noted and other objects, in one aspect, may be achieved by method for welding for joining two metallic components disclosed in the present disclosure. The method for welding comprises the steps of melting the metallic components in a weld region to a molten state to form a weld pool through an energy input by directing at least one first source of energy on the metallic components to join the metallic components. A second source of energy is focused to heat a heating region surrounding the complete weld pool from all sides to reduce cooling rate and extend solidification time of the weld pool.

By applying a locally acting controllable heat-input in form of the second source of energy for heating in addition to the first source of energy which is needed for melting at locations around the weld pool or surrounding the complete weld pool area generates a temperature evaluation mechanism which results in improved weld and removal of many welding defects.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

A possible arrangement for practicing the welding method is schematically shown in FIG. 1, FIG. 2A, FIG. 2B, FIG. 2C, FIG. 3A, FIG. 3B and FIG. 3C.

Figure 1:
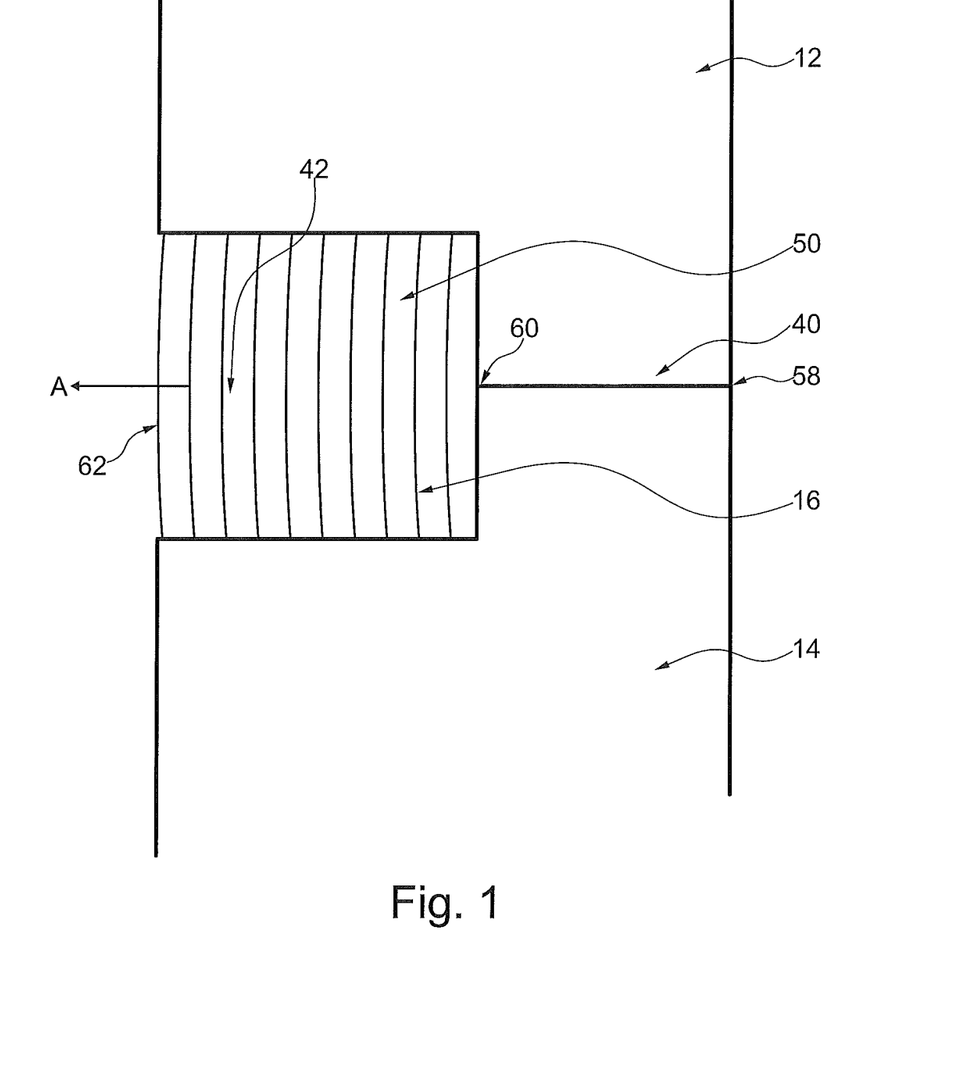
FIG. 1 illustrates a typical example of setup for welding with metal parts in accordance with an exemplary embodiment of the present disclosure.

Referring now to FIG. 1, the two metallic components 12, 14 are arranged next to each other such that there is nearly a zero gap between the two components 12, 14. In one embodiment of the present disclosure, the step of joining two metallic components 12, 14 is performed in two stages, the first stage being a root weld 40 and the second stage being a fill up weld 42. The root weld 40 is completed at the joining of the two discs 12, 14 starting from a middle portion 58 to a point 60 up to which there is still a zero gap between the two discs 12, 14. From the point 60 there exists a non-zero gap between the two discs 12, 14 up to an outer portion 62. The filler gap 50 is filled by fill up welding 42. During fill up welding 42, a filler wire 44 is melted along with the two discs 12, 14 by using the first source of energy 18, and to fill the filler gap 50 along with molten material of the two discs 12, 14. A weld region 16 constitute both the root weld 40 and the fill up weld 42 where melting of the two metallic components 12, 14 takes place through the high level of energy supplied by first source of energy 18. The root weld 40 is performed without the filler wire 44, whereas the fill up weld 42 is performed by using the filler wire 44 shown in FIG. 2A.

Figure 2A:
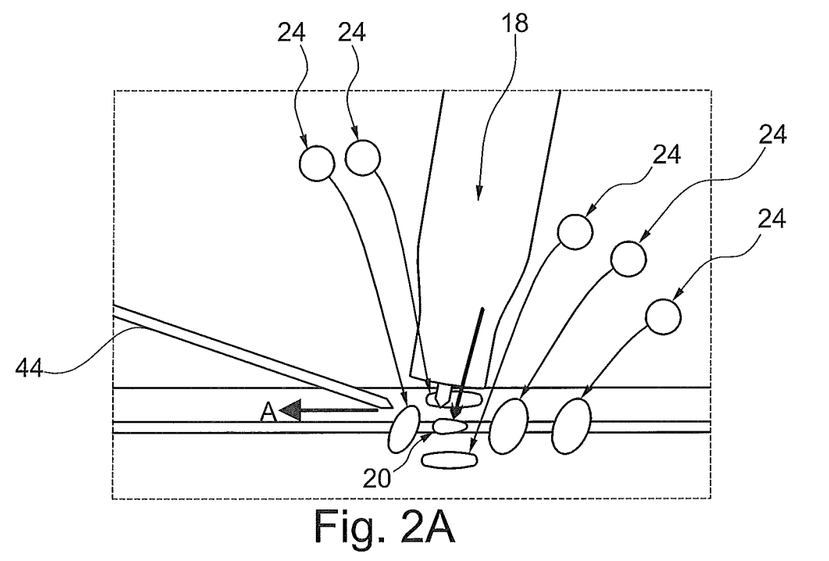
FIG. 2A illustrates a typical example of setup for welding with one first source of energy and multiple second source of energy, in accordance with an exemplary embodiment of the present disclosure.

In present disclosure for example the two metallic components 12, 14 which are to be joined are two discs of a rotor 46 and this weld is performed in narrow gap geometry 22. Initially a root weld 40 is performed in the direction of arrow A, as illustrated in more detail in FIG. 2A, at least one first source of energy 18 is directed on the two metallic components 12, 14. The first source of energy 18 is melting the two metallic components 12, 14. A weld pool 20 is formed from the molten metallic components 12, 14 for joining of the metallic components 12, 14. At least one second source of energy 24 is directed to heat a heating region 48 surrounding the complete weld pool 20 to reduce the cooling rate and extend a solidification time of the weld pool 20 as shown in FIG. 2C. The second source of energy 24 is locally acting, controllable heat input which is applied in addition the heat input which is provided by the first source of energy 18 at more than one location surrounding the weld pool 20 and is applied to the heating region 48 which is surrounding the complete weld pool 20. The solidification time is the time when the temperature of weld is between 800-500° C.

The first source of energy 18 is melting the two metallic components 12, 14 and the second source of energy 20 is heating the heating region 48 to keep the temperature of weld pool 20 for a longer time so that the solidification time of weld pool 20 will increase and the cooling rate of the weld pool 20 is done in an controllable way in order to overcome the defects of welding which occur during the welding process.

Figure 2B:
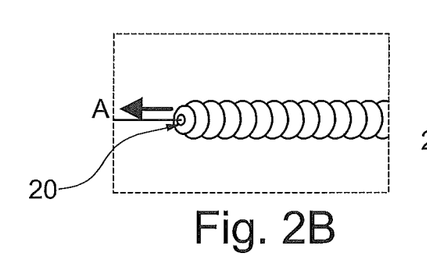
FIG. 2B illustrate top view of a weld pool and the direction of welding.
Figure 2C:
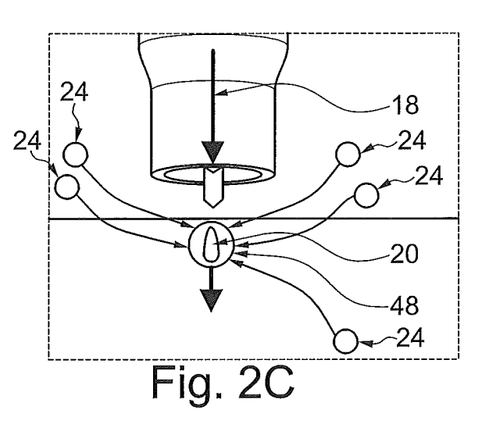
FIG. 2C illustrates front view of a weld pool with first and second energy source.

As seen in FIG. 2B, weld pool 20 develops in a direction of welding which is represented by arrow A and joining the two metallic components 12, 14 after solidification.

In one embodiment of the present disclosure, the first source of energy 18 and the second source of energy 24 are single or multiple heat sources. The first source of energy 18 is a single source of heat and the second source of energy 24 are multiple heat sources located at multiple positions as shown in FIGS. 2A and 2C. However the first source of energy 18 can also be a multiple heat sources located at multiple positions to heat the two discs 12, 14 and can be movable.

In another embodiment of the present disclosure, the metallic components 12, 14 are high- or low-alloy heat-resistant steel and Nickel-based material. The present method of welding is intend for crack sensitive materials for example high alloyed heat resistant 8-13% Cr steel, low alloyed CrMo, CrMoV, NiCrMo and CrNiMo steel and Ni-Base materials.

In yet another embodiment of the present disclosure, the first source of energy 18 and the second source of energy 24 are beams of energy sources such as, electric arc sources, laser sources, electron beam sources, plasma sources, ultrasonic beams or combination of those. The first source of energy 18 is an arc-based welding source which is preferably TIG. The second source of energy 24 is preferably a laser which is an oscillating and/or weaving beam and/or power-modulated which is locally acting herein after referred as "moving beam" 24.

Figure 3A:
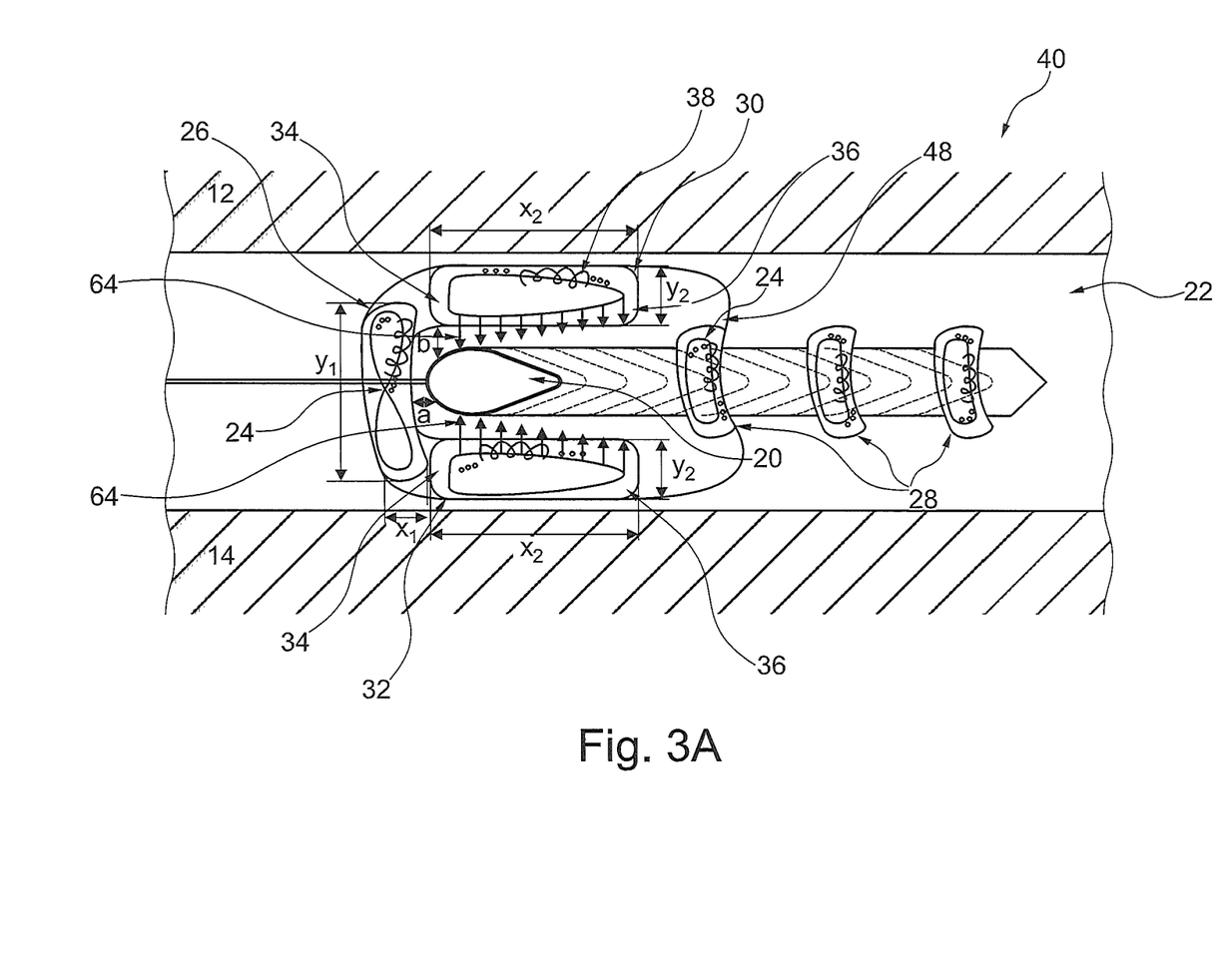
FIG. 3A illustrates a top view of a weld pool having different heating positions in the heating region around the weld pool.

In yet another embodiment the moving beam 24 is adapted to be focused via multiple heat sources located at multiple locations above the weld pool 20 on at least one position of heating region 48, surrounding the complete weld pool 20. The moving beam 24 provides controllable heat in form of the multiple heat sources which are located at the multiple locations in the focused or a defocussed way targeting the position which are located on heating region 48 which is surrounding the weld pool 20 in such a way to heat the weld pool 20 from such positions. The moving beam 24 provides heat only to the extent of heating that does not lead to melting. The moving beam 24 is moved transverse to the direction in order to produce a weaving motion which leads to the formation of weave beads 38 as shown in FIG. 3A. Various types of laser like gas laser, solid-state lasers for example. Nd:YAG, thin-disk, semiconductor-lasers for laser-diodes and dye lasers are used.

As shown in FIG. 3A, preferably in the root weld 40, the moving beam 24 is positioned relatively to the weld-pool 20 focusing on at least one position that is leading 26 in front of the weld pool, trailing 28 behind the weld pool, on both sides leading 26 and trailing 28 of the weld-pool 20, surrounding the whole weld-pool 20. These scenarios are realized by moving beam 24 which is scanner driven and power modulated in combination with a pyrometer to control the heat-input in addition to the first source of energy 18 heat-input.

In yet another embodiment the moving beam 24 is adapted to be focused via multiple heat sources located at multiple locations on heating position 30 towards disc 12 and heating position 32 towards disc 14 besides the weld pool 20 along with the leading pre-heating position 26 in front of the weld pool 20 and the trailing post-heating position 28 behind the weld pool 20 in the root weld 40.

The moving beam 24 is placed before the weld pool 20 in the leading position 26 and/or after the weld pool in the trailing position 28 where the welding takes place, thereby achieving spatial pre-heating and/or post-heating of the two discs 12, 14, respectively. The simultaneous heating before and/or after the weld pool 20 leads to an temperature-evolution that would improve the weldability of the material by extending the solidification time during welding, which is the time between when the temperature of the weld seam and adjacent heat-affected zone is between 800° C. and 500° C. which temperature range lie below liquidus temperature. Thus, the molten weld-pool 20 is having a longer time until solidification. Moreover, higher welding speeds and deposition-rates might be achieved using the additional moving laser-based beam 24 for heating. Reheating behind the weld pool area 28 reduces the cooling rate especially and thus extending the solidification time, which directly leads to lower hardness. When pre-heating takes place in the leading position 26, this leads to an improvement of the mechanical properties, i.e. the first source of energy 18 would need less energy for welding and as a consequence less stress would be induced in the weld after the solidification of the weld pool 20.

In order to improve the quality of the weld a reduction in the lack of fusion is possible by positioning the moving beam 24 relatively to the weld-pool focusing on the heating positions in the heating area 48 in the leading position 26 in front of the weld pool 20, trailing position 28 behind the weld pool 20, on both leading position 26 and trailing position 28, on one side 30 towards disc 12 and on other side 32 towards disc 14, or surrounding the whole weld-pool 20 and providing the heat in a controllable manner in the heating region 48, around the weld pool 20 within the range of 300° C.-450° C. in order to keep the heat inside the weld pool 20. Particularly, the heating positions 30 and 32 are heated by the multiple heat source for example through the moving beam 24 located at multiple positions to induce a compressive stress 64 towards the weld pool 20 which helps in pulling and keeping both the disc 12, 14 with zero gap or close to each other thereby reducing the tolerance limit which is kept for zero gap.

In yet other embodiment, heat is controlled through power modulation, oscillation and/or weaving of the moving beam 24 for the heating positions 30 and 32 as more power is required to maintain the temperature around 450° C. in a region 34 of heating positions 30, 32 and less power is required to maintain the temperature within range of 300° C. in a region 36 around the weld pool 20. Heat is supplied in both these region 34 and 36 is controllable through power modulation. Also, the power-modulation of the moving beam 24 is arranged such that more power is applied when the moving beam 24 is close to the side walls of the disc 12 and 14 and less when the moving beam 24 is away from the side walls towards the weld pool 20. The power-modulation is applicable to any heating position in the heating region 48 surrounding the weld pool 20. The heat is supplied for example through laser power. The region 36 is heated with supply of laser power for example "A" kW and the region 34 is heated with supply of laser power for example "B" kW. The "A" kW will be less than "B" kW to create a distribution of compressive stress as indicated by arrows 64 of different lengths. The longer the arrows are, the higher the stress is as indicated in the FIG. 3A.

The size of the leading heating position 26, the trailing positions 28 and side positions 30 and 32 and their distance from the weld pool are adjustable depending upon the size and depth of the joint which is to be welded. Depending upon the size and depth of the joint to be welded, the size and position of the heating positions on the heating region as well as the distance from the weld pool is determined. The length, width and distance from the weld pool is marked in exemplary manner where X1, X3 and X2 represents the width and Y1, Y3 and Y2 represents the length of the leading heating position 26, the trailing positions 28 and side positions 30 and 32 respectively. The distance "a" and "b" mark the distance from the leading heating position 26 and the side positions 30 and 32 respectively from the weld pool 20.

To improve the quality of the weld in terms of porosity, the weld pool 20 is heated at multiple positions in the trailing positions 28 through the multiple heat sources in the form of the moving beam 24 and kept for an extended time in the solidification region during which degasing can occur for a longer time. During such degasing the usage of protection-gas is mandatory.

Figure 3B:
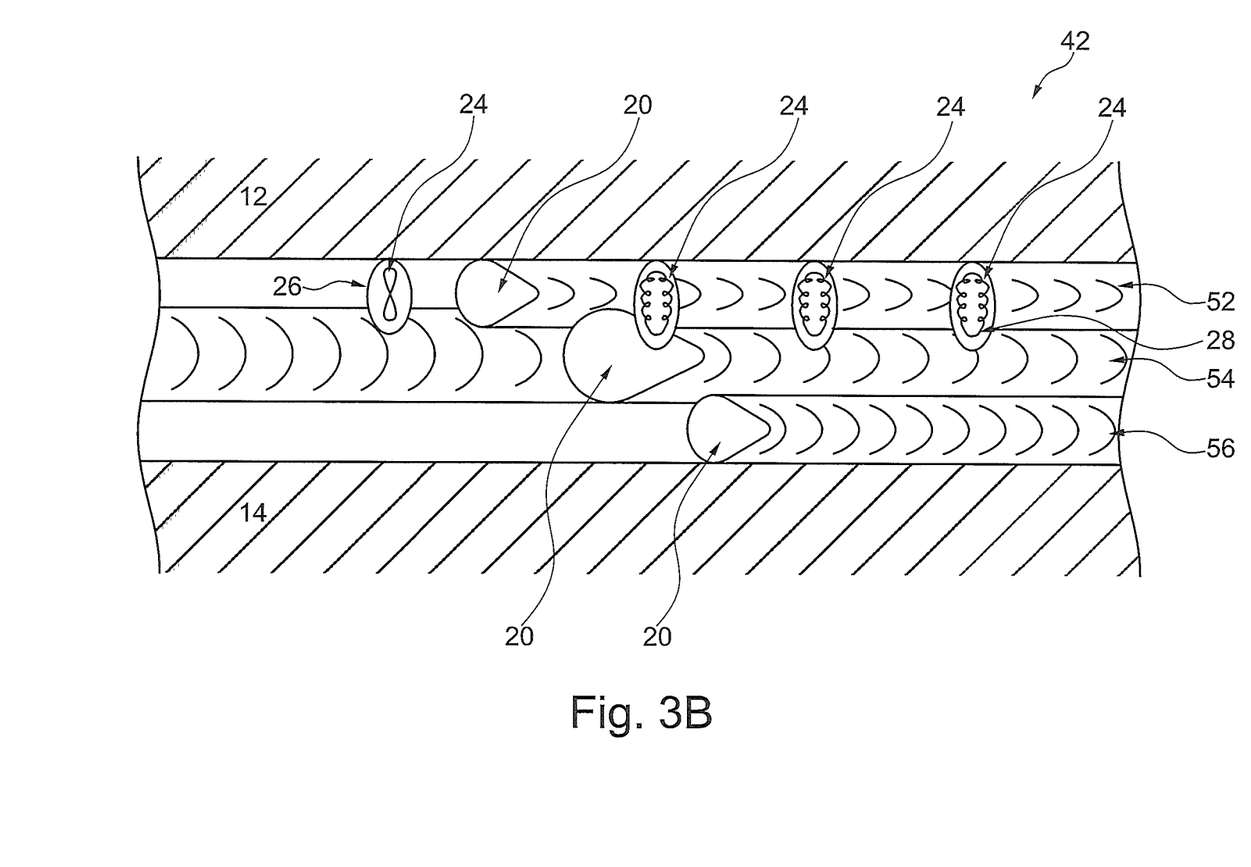
FIG. 3B illustrates a multi-pass welding for a filler weld.

FIG. 3B illustrates a multi-pass welding, where fill-up welding 42 is applied to fill the non-zero region, i.e. the filler gap 50 between the two discs 12 and 14. The fill-up welding 42 is formed by multiple passes, i.e. both horizontally and vertically passes are deposited consecutively. Here for example three passes horizontally next to one another are the first pass 52, second pass 54 and third pass 56 to fill the filler gap 50 which are performed with the filler wire 44 in center as well as along the sides walls of the discs 12 and 14 placed horizontally next to one another, which form the one layer of the fill-up weld 42.

Pre-heating at leading position 26 and post-heating at trailing positions 28 are done here to improve the connection with the side-wall of the disc 12 and 14 and to elongate the solidification time with multiple heating sources, respectively. This embodiment of multi-pass welding is useful for the narrow gap 22.

Figure 3C:
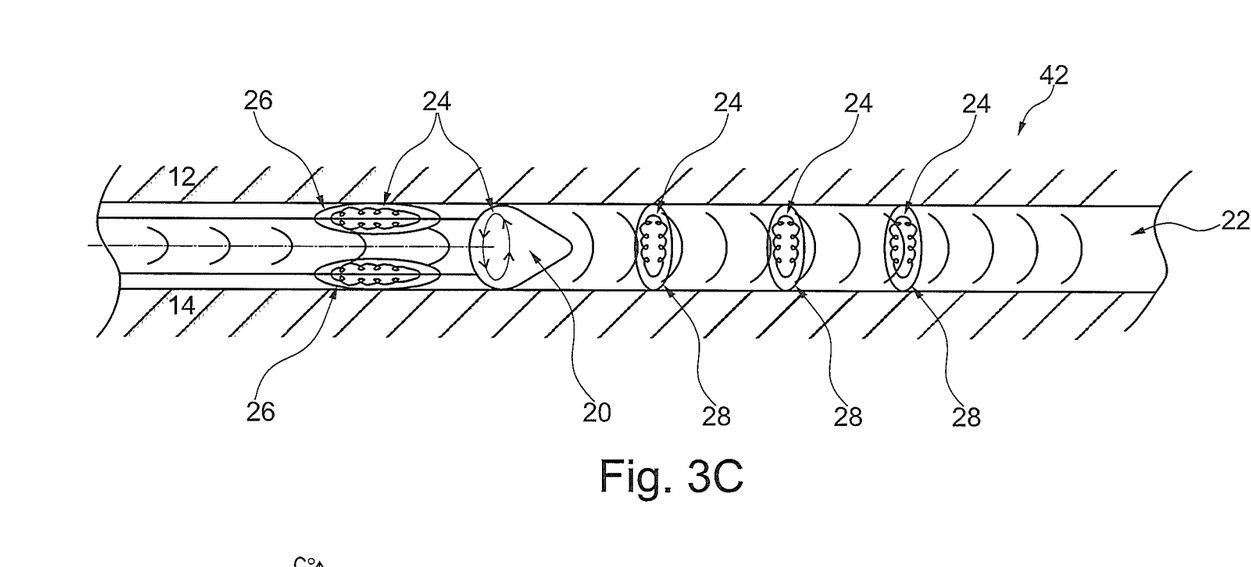
FIG. 3C illustrate a single pass welding for a filler weld.

FIG. 3C depicts another embodiment of fill-up welding which is done by multiple passes, i.e. by depositing vertically layers to fill the gap between the two discs 12 and 14 to form multiple layers 42. Again pre-heating at the leading position 26 and post-heating at the trailing positions 28 are done here to improve the connection with the side-wall of the disc 12 and 14 and to elongate the solidification time with multiple heating sources. This embodiment of welding applies for the narrow-gap 22, i.e. one pass is enough to form one layer in the gap reaching to the side walls of both discs 12 and 14.

In yet another embodiment the moving beam 24 is adapted to be focused via multiple heat sources located at multiple locations on at least one leading pre-heating position 26 in front of the weld pool 20 and on at least one trailing post-heating position 28 behind the weld pool 20 in the fill-up weld 42.

The fill up weld 42 is applied for both above embodiments having the non-zero gap where heat flow in the pre-heating at leading positions 26 and post-heating at trailing positions 28 are controlled through power modulation. Furthermore first source of energy 18 is also power modulated in case a laser is used for welding as shown in FIG. 3C.

Figure 4:
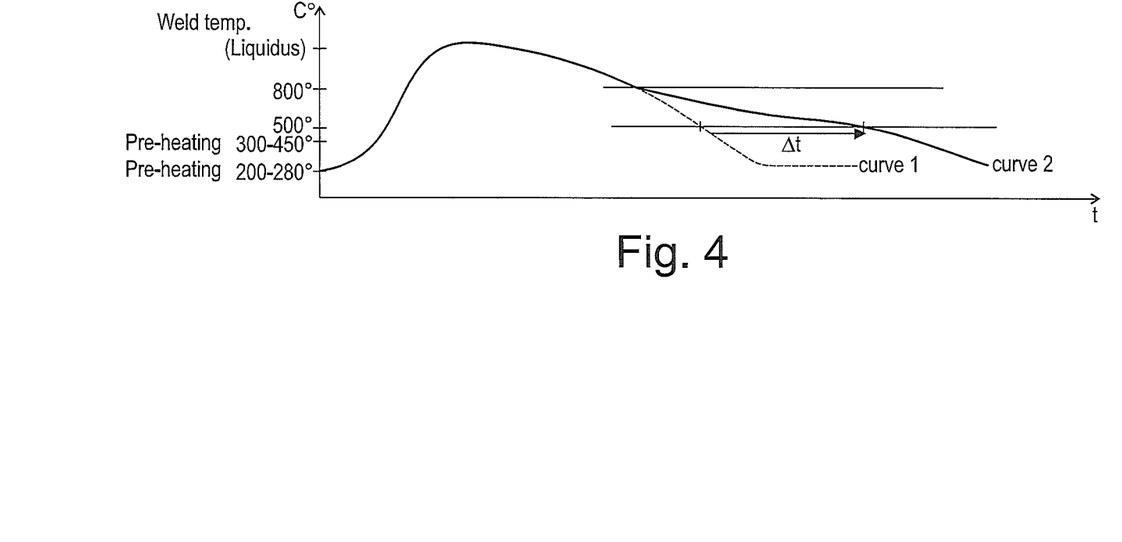
FIG. 4 illustrates a temperature evolution in weld zone and nearby heating zone.

FIG. 4 illustrate the temperature evolution in weld region 16 and nearby heating region 48 where heating is done within range of 300° C.-450° C. in the heating region 48 around the weld pool 20 at multiple positions through the multiple heat sources in the form of the moving beam 24 which increase the solidification time and decrease the cooling rate as compared to the situation if only the first source of heating was used.

The present welding method is particularly useful during the narrow gap geometry 22 which is the joint geometry needed for welding parts of power equipment for example turbine rotor. This welding method is useful for all joints depths including the deep joints of about 400 mm or more.

Figure 5A:
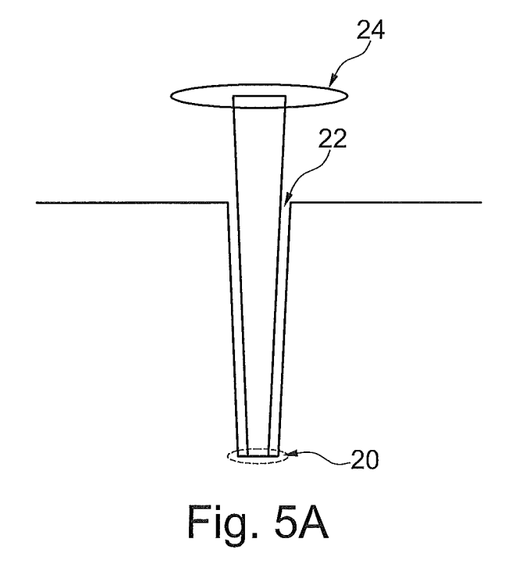
FIG. 5A illustrates second source of energy focused around a weld pool.
Figure 5B:
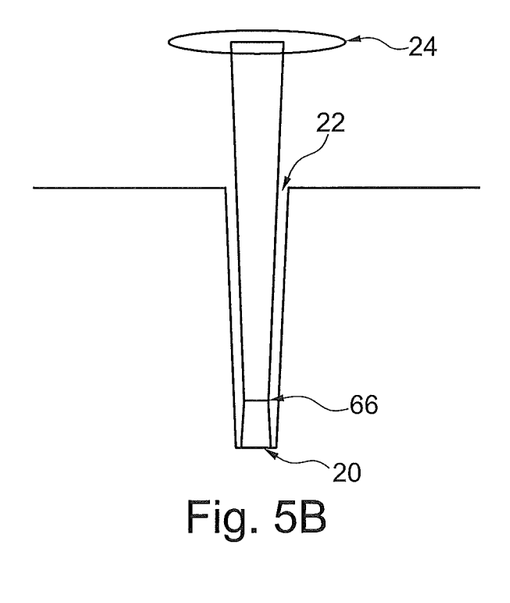
FIG. 5B illustrates second source of energy focused above the weld pool in a deep, narrow-gap joint-geometry.

As shown in FIG. 5A and FIG. 5B for accessing the narrow gap geometry 22, the moving beam 24 is used as second source of energy for all joints including the deep joints of the range of 400 mm joint depth.

In yet another embodiment, the moving beam 24 is a focused low power laser beam or a defocused high power laser beam to heat the heating region 48 surrounding the complete weld pool 20 from all sides in the narrow gap geometry 22 for all joint depths. Preferably as shown in FIG. 5A, a focused low power moving beam 24 is concentrated at the heating region 48 surrounding the complete weld pool 20.

In FIG. 5B, at a distance from the weld pool, the moving beam 24 is a defocussed high power laser beam is concentrated above the weld pool 20 at a point 66, so as to cover the heating region 48 surrounding the complete weld pool 20 from all sides. In both the case the intensity of the moving beam 24 is lower than what is required for welding as the oscillating laser beam 24 serves an additional heating source which is capable of heating only.

Figure 6A:
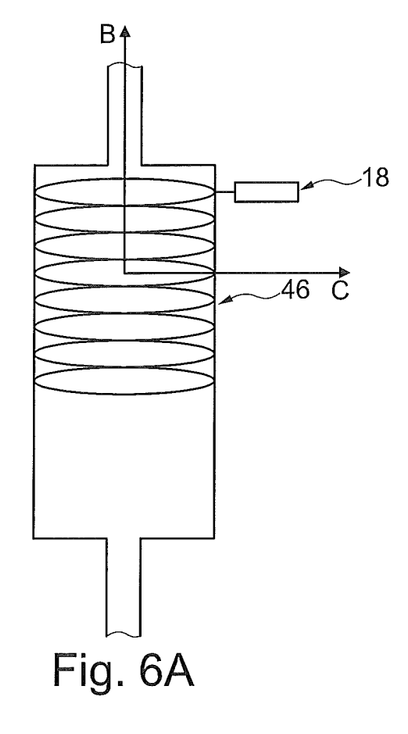
FIG. 6A illustrate for example a turbine rotor with metallic components in vertical position with source of energy in horizontal position.
Figure 6B:
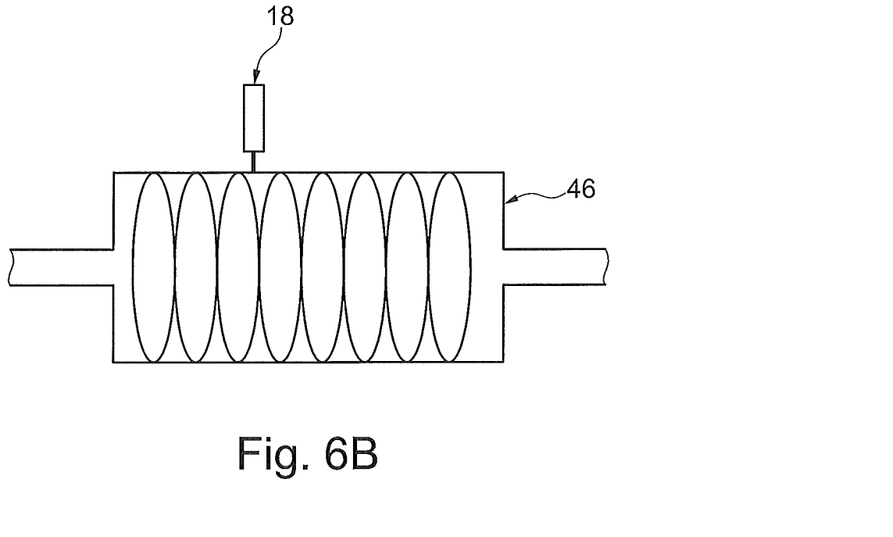
FIG. 6B illustrates for example a turbine rotor with metallic components in horizontal position with source of energy in vertical position.

In FIG. 6A an example is shown for a turbine rotor with stacked rotor discs in a vertical position with respect to ground with the energy source particularly the first energy source 18, i.e. TIG torch in horizontal position for welding. In FIG. 6B for example a turbine rotor with stacked rotor discs in horizontal position with the source of energy particularly the first energy source 18, i.e. TIG torch in vertical position is depicted.

The present welding method is focused on deep welding welds in a narrow gap weld geometry applicable to any type of welding applications including but not limited to welding of steam turbines, gas turbines and turbo generators rotors and hydro power generations components. As shown in FIG. 6A the depth of the deep weld which is to be welded between two adjacent stacked discs is generally about 100-500 mm, preferably 250-400 mm, measured in the radial direction C of the disk. The width of the narrow gap in the axial direction B is about 10-30 mm, preferably about 20 mm. The shape of weld pool 20 and heating positions for example have been shown in elliptical shapes, however all other shapes including circular, rectangular, square etc. is also possible.

The present method is advantageous as it increases the weldability and quality of the weld to reduce the risk of cracks, to lower porosity and formation of lack of fusion. Through the present method, welding speed/deposition-rate can be increased and also mechanical properties of the welding joint can be improved. The heating of the region surrounding the complete weld pool helps in removing welding defects, change the mechanical properties of the welding joint after the solidification. The power modulation of heating sources during beam-oscillation and/or weaving is advantageous in heating the particular region up to a particular temperature in a deep weld joint in a narrow gap geometry to induce the compressive stress which leads to the pressing any two discs together easier in order to create a zero gap, which leads to a better weld quality after solidification. The power-modulated controlled heating in the pre-heating positions and post-heating positions removes welding defects and it is helpful in welding the crack-sensitive materials which are welded during the rotor-manufacturing.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above examples teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

The invention claimed is:

1. A method of welding for joining two metallic components, the method comprising:
   arranging a first metallic component of the two metallic components and a second metallic component of the two metallic components for a zero gap portion and a non-zero gap portion therebetween;
   joining the two metallic components at the zero gap portion with a root weld;
   joining the two metallic components at the non-zero gap portion with a fill up weld;
   melting the two metallic components in a weld region of the root weld and the fill up weld into a molten state to form a weld pool through an energy input by directing at least one first source of energy on the two metallic components to join the two metallic components; and
   focusing at least one second source of energy to heat a heating region, which heating region surrounds the weld pool from all sides, to reduce cooling rate and extend solidification time of the weld pool,
   wherein the at least one second source of energy is adapted to be focused in multiple positions of the heating region via multiple heat sources, the multiple positions including:
      at least one leading pre-heating position in front of the weld pool,
      at least one trailing post-heating position behind the weld pool,
      at least one first side position on the first metallic component, the at least one first side position adjacent the weld pool and between the at least one leading pre-heating position and the at least one trailing post-heating position, and
      at least one second side position on the second metallic component, the at least one second side position adjacent the weld pool and between the at least one leading pre-heating position and the at least one trailing post-heating position.

2. The method as claimed in claim 1, wherein the two metallic components are joined in two stages, the first stage being the root weld made without use of filler wire and the second stage being the fill-up weld made with use of filler wire.

3. The method as claimed in claim 1, wherein the two metallic components are high- or low-alloy heat-resistant steel and Nickel-based material.

4. The method as claimed in claim 1, wherein the at least one first source of energy is a single heat source or multiple heat sources.

5. The method as claimed in claim 4, wherein the at least one first source of energy and the at least one second source of energy are beams of energy sources from electric arc sources, laser sources, electron beam sources, plasma sources, ultrasonic beams or a combination thereof.

6. The method as claimed in claim 5, wherein the at least one first source of energy is an arc based tungsten inert gas torch.

7. The method as claimed in claim 5, wherein the at least one second source of energy is a moving beam.

8. The method as claimed in claim 7, wherein the at least one second source of energy is an oscillating laser beam.

9. The method as claimed in claim 7, wherein the at least one second source of energy is a weaving laser beam.

10. The method as claimed in claim 7, wherein the moving beam is via multiple heat sources located at multiple locations above the weld pool.

11. The method as claimed in claim 1, wherein heating at the at least one first side position and at the at least one second side position induces a compressive stress to pull and keep both the first metallic component and the second metallic component with zero gap thereby reducing a tolerance limit for zero gap in the root weld.

12. The method as claimed in claim 7, wherein the moving beam is power modulated.

13. The method as claimed in claim 7, wherein the moving beam is a focused low power laser beam or a defocused high power laser beam to heat the heating region surrounding the weld pool from all sides in a narrow gap geometry for all joint depths.

14. The method as claimed in claim 12, wherein more power is applied for heating a first region of heating positions, and less power is applied for heating a second region of the heating positions.

15. The method as claimed in claim 1, wherein the two metallic components are in vertical position and the at least one first source of energy is in horizontal position during welding.

16. The method as claimed in claim 1, wherein the two metallic components are in horizontal position and the at least one first source of energy is in vertical position during welding.

17. A method of welding for joining two metallic components, the method comprising:

directing at least one first source of energy on a first metallic component of the two metallic components and a second metallic component of the two metallic components;

melting the first metallic component and the second metallic component in a weld region of the first metallic component and the second metallic component into a molten state to form a weld pool through an energy input by the at least one first source of energy; and focusing a plurality of second sources of energy to heat a heating region, the heating region surrounding the weld pool from all sides to reduce cooling rate and extend solidification time of the weld pool, wherein the plurality of second sources of energy are adapted to be focused in multiple positions of the heating region via multiple heat sources, the multiple positions including:

at least one leading pre-heating position in front of the weld pool, at least one trailing post-heating position behind the weld pool, at least one first side position on the first metallic component, the at least one first side position adjacent the weld pool and between the at least one leading pre-heating position and the at least one trailing post-heating position, and at least one second side position on the second metallic component, the at least one second side position adjacent the weld pool and between the at least one leading pre-heating position and the at least one trailing post-heating position.

* * * * *